US009336457B2

(12) United States Patent  
Raykar et al.

(10) Patent No.: US 9,336,457 B2  
(45) Date of Patent: May 10, 2016

(54) ADAPTIVE ANATOMICAL REGION PREDICTION

(71) Applicants: Vikas C. Raykar, Bangalore (IN); Yiqiang Zhan, West Chester, PA (US); Maneesh Dewan, San Jose, CA (US); Gerardo Hermosillo Valadez, West Chester, PA (US); Zhigang Peng, Blue Bell, PA (US); Xiang Sean Zhou, Exton, PA (US)

(72) Inventors: Vikas C. Raykar, Bangalore (IN); Yiqiang Zhan, West Chester, PA (US); Maneesh Dewan, San Jose, CA (US); Gerardo Hermosillo Valadez, West Chester, PA (US); Zhigang Peng, Blue Bell, PA (US); Xiang Sean Zhou, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 233 days.

(21) Appl. No.: 14/096,206

(22) Filed: Dec. 4, 2013

(65) Prior Publication Data

US 2014/0161337 A1    Jun. 12, 2014

Related U.S. Application Data

(60) Provisional application No. 61/734,152, filed on Dec. 6, 2012.

(51) Int. Cl.
*G06K 9/62* (2006.01)
*G06T 7/00* (2006.01)

(52) U.S. Cl.
CPC .............. *G06K 9/6202* (2013.01); *G06K 9/629* (2013.01); *G06K 9/6211* (2013.01); *G06T 7/0028* (2013.01); *G06T 2207/10072* (2013.01); *G06T 2207/30016* (2013.01); *G06T 2207/30096* (2013.01)

(58) Field of Classification Search
None
See application file for complete search history.

(56) References Cited

U.S. PATENT DOCUMENTS

| | | | | |
|---|---|---|---|---|
| 8,121,362 | B2 * | 2/2012 | Zhan | G06K 9/32 382/128 |
| 8,837,860 | B1 * | 9/2014 | Grady | G06T 5/50 382/284 |
| 2007/0081712 | A1 * | 4/2007 | Huang | G06T 7/0028 382/128 |
| 2007/0242901 | A1 * | 10/2007 | Huang | G06K 9/4671 382/294 |
| 2008/0234578 | A1 * | 9/2008 | Claus | A61B 6/037 600/437 |
| 2010/0002921 | A1 * | 1/2010 | Fenchel | A61B 5/055 382/128 |
| 2010/0105306 | A1 * | 4/2010 | Daley | A22B 5/0041 452/135 |
| 2010/0272330 | A1 * | 10/2010 | Pekar | G06K 9/3216 382/128 |
| 2010/0284590 | A1 * | 11/2010 | Peng | A61B 6/032 382/128 |
| 2012/0269407 | A1 * | 10/2012 | Criminisi | G06T 7/0048 382/128 |

OTHER PUBLICATIONS

Mathematics Stack Exchange (http://math.stackexchange.com/questions/157507/error-metric-which-incorporates-both-mean-standard-deviation-of-data-in-euclid), posted Jun. 12, 2012.*

(Continued)

*Primary Examiner* — Nirav G Patel
*Assistant Examiner* — Alexander J Lesnick
(74) *Attorney, Agent, or Firm* — Peter R. Withstandley (57) ABSTRACT

Disclosed herein is a framework for facilitating adaptive anatomical region prediction. In accordance with one aspect, a set of exemplar images including annotated first landmarks is received. User definitions of first anatomical regions in the exemplar images are obtained. The framework may detect second landmarks in a subject image. It may further compute anatomical similarity scores between the subject image and the exemplar images based on the first and second landmarks, and predict a second anatomical region in the subject image by adaptively combining the first anatomical regions based on the anatomical similarity scores.

20 Claims, 7 Drawing Sheets

(56) References Cited

OTHER PUBLICATIONS

Zhan, et al, Active Scheduling of Organ Detection and Segmentation in Whole-Body Medical Images, MICCAI (1) 2008: 313-321.

Brendan J. Frey and Delbert Dueck, "Clustering by Passing Messages between Data Points," Science 315, 972-976, Feb. 2007.

* cited by examiner

Fig. 7

ADAPTIVE ANATOMICAL REGION PREDICTION

CROSS-REFERENCE TO RELATED APPLICATION

This application claims the benefit of U.S. provisional application No. 61/734,152 filed Dec. 6, 2012, the entire contents of which are incorporated herein by reference.

TECHNICAL FIELD

The present disclosure generally relates to diagnostic imaging and, more specifically, to automated or semi-automated systems and methods for facilitating adaptive anatomical region prediction.

BACKGROUND

The field of medical imaging has seen significant advances since the time X-Rays were first used to determine anatomical abnormalities. Medical imaging hardware has progressed in the form of newer machines such as Medical Resonance Imaging (MRI) scanners, Computed Axial Tomography (CAT) scanners, etc. Because of large amount of image data generated by such modern medical scanners, there has been and remains a need for developing image processing techniques that can automate some or all of the processes to determine the presence of anatomical abnormalities in scanned medical images.

Digital medical images are constructed using raw image data obtained from a scanner, for example, a CAT scanner, an MRI, etc. Digital medical images are typically either a two-dimensional ("2-D") image made of pixel elements or a three-dimensional ("3-D") image made of volume elements ("voxels"). Such 2-D or 3-D images are processed using medical image recognition techniques to determine the presence of anatomical abnormalities such as cysts, tumors, polyps, etc. Given the amount of image data generated by any given image scan, it is preferable that an automatic technique should point out anatomical features in the selected regions of an image to a doctor for further diagnosis of any disease or condition.

Automatic image processing and recognition of structures within a medical image is generally referred to as Computer-Aided Detection (CAD). A CAD system can process medical images and identify anatomical structures or regions, including possible abnormalities (or candidates) for further review. Automatic detection of anatomical regions in medical images benefits a clinical workflow in various aspects. For example, high-resolution MR scanning range can be optimized based on the automatically-detected anatomical regions. Learning-based approaches can be used to detect such anatomical regions in a robust way. However, even for the same anatomy, the definition of a region-of-interest may be different across clinical sites (e.g., hospitals, imaging centers, etc.).

More particularly, each clinical site may implement an imaging or scanning protocol that standardizes the way in which images are acquired using the various modalities at that particular clinical site. The imaging protocol specifies, for example, coil selection, field-of-view (FOV), in-plane resolution, and other imaging parameters that are tailored to the specific clinical site's policies, settings and preferences. Different clinical sites may apply different imaging protocols that define the region-of-interest differently. In order to adapt to the different imaging protocols, learning-based approaches may need to be re-trained for each specific clinical site to ensure consistent scan quality. Such re-training at clinical sites is not always feasible, and can be a difficult or an impossible process due to various reasons. For example, there may be a lack of training data at the clinical site; computational resources may be limited; and so forth.

Therefore there is a need for improved systems and methods for automated or semi-automated anatomical region detection in medical images.

SUMMARY

The present disclosure relates to a framework for facilitating adaptive anatomical region prediction. In accordance with one aspect, a set of exemplar images including annotated first landmarks is received. User definitions of first anatomical regions in the exemplar images are obtained. The framework may detect second landmarks in a subject image. It may further compute anatomical similarity scores between the subject image and the exemplar images based on the first and second landmarks, and predict a second anatomical region in the subject image by adaptively combining the first anatomical regions based on the anatomical similarity scores.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings. Furthermore, it should be noted that the same numbers are used throughout the drawings to reference like elements and features.

DETAILED DESCRIPTION

In the following description, numerous specific details are set forth such as examples of specific components, devices, methods, etc., in order to provide a thorough understanding of embodiments of the present invention. It will be apparent, however, to one skilled in the art that these specific details need not be employed to practice embodiments of the present invention. In other instances, well-known materials or methods have not been described in detail in order to avoid unnecessarily obscuring embodiments of the present invention. While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of a radiosurgery or radiotherapy procedure, which may include times when the radiation source is either on or off. From time to time, for convenience of description, CT imaging data may be used herein as an exemplary imaging modality. It will be appreciated, however, that data from any type of imaging modality including, but not limited to, X-Ray radiographs, MRI, CT, PET (positron emission tomography), PET-CT, SPECT, SPECT-CT, MR-PET, 3D ultrasound images or the like may also be used in various embodiments of the invention.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system's memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention.

As used herein, the term "image" refers to multi-dimensional data composed of discrete image elements (e.g., pixels for 2-D images and voxels for 3-D images). The image may be, for example, a medical image of a subject collected by computed tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of two or three mutually orthogonal axes. The terms "digital" and "digitized" as used herein will refer to images or volumes, as appropriate, in a digital or digitized format acquired via a digital acquisition system or via conversion from an analog image.

A framework for facilitating adaptive anatomical region prediction is described herein. One implementation of the framework seeks to provide an approach for automatically selecting a scanning field (or field-of-view) within a medical image for localization of a medical image study. By automatically selecting the scanning field, rather than having the field manually selected by a human operator, the process of acquiring a medical image may be sped up, made more reliable, efficient, consistent and/or repeatable.

One aspect of the present framework advantageously provides automatic anatomical region detection with on-line "end-user training" functionality. The framework is able to adapt its detection results to specific definitions from different users. In accordance with one implementation, user-annotated images are used as exemplars. Given a new image of a subject, the framework can predict the anatomical region in the subject image via a selective combination of annotated regions in the exemplars. The combination coefficients for selectively combining the annotated regions may be derived from the anatomical similarity described by a common set of anatomical landmarks in both the exemplars and the subject image.

The present framework is advantageously robust to outliers and can handle missing landmarks in the image datasets. In addition, it provides an online trainable model that is easy to update as more annotated images are collected. Even further, it facilitates quantification of uncertainty in the prediction of anatomical regions. These and other advantages and exemplary features will be described in more detail in the following description.

The present framework can be applied to image data acquired by one or more different imaging modalities including, but not limited to, magnetic resonance (MR) imaging, computed tomography (CT), helical CT, x-ray, positron emission tomography (PET), PET-CT, fluoroscopic, ultrasound, single-photon emission computed tomography (SPECT), SPECT-CT, MR-PET, etc.

Figure 1:
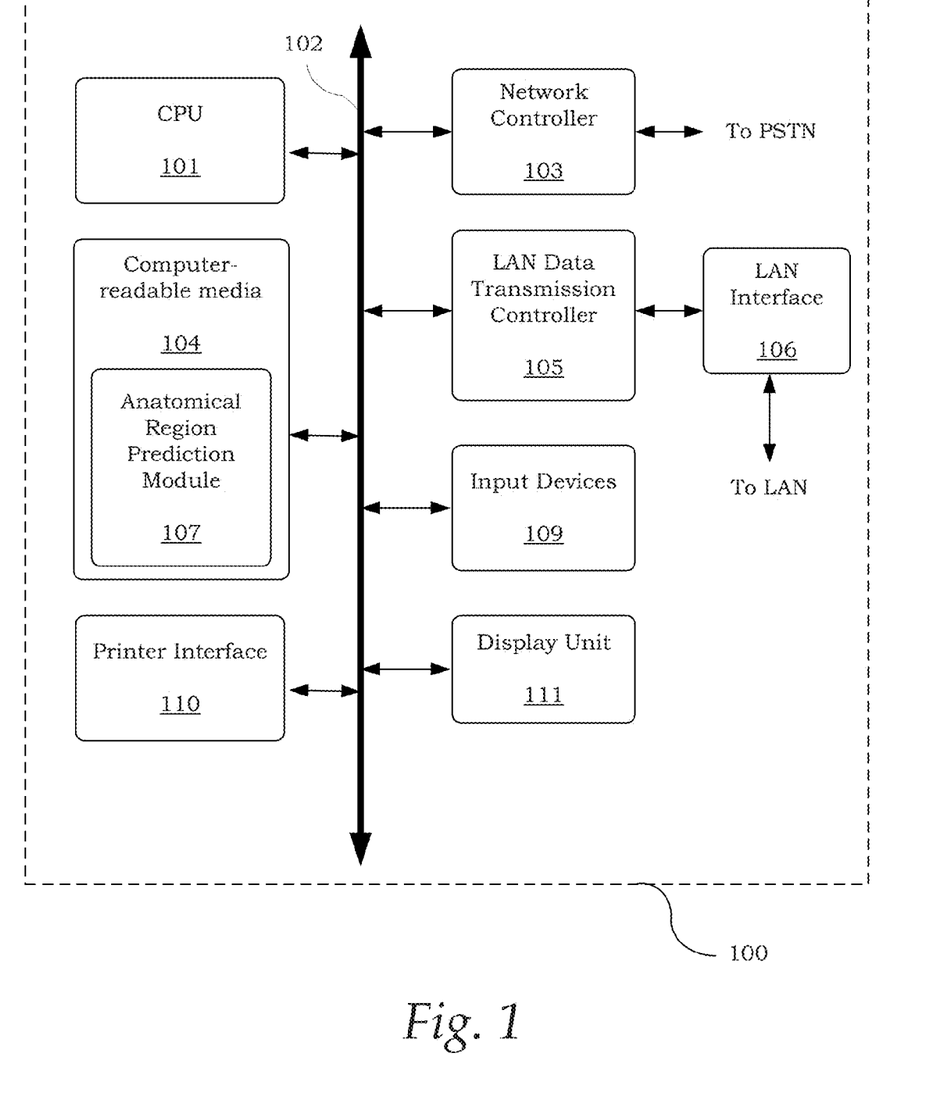
FIG. 1 shows an exemplary computer system.

FIG. 1 shows an exemplary computer system for implementing a method and system of the present disclosure. The computer system referred to generally as system 100 may include, inter alia, a central processing unit (CPU) 101, computer-readable media 104, a printer interface 110, a display unit 111, a local area network (LAN) data transmission controller 105, a LAN interface 106, a network controller 103, an internal bus 102, and one or more input devices 109, for example, a keyboard, mouse, touch screen, etc. Computer system 100 may further include support circuits such as a cache, a power supply, clock circuits and a communications bus. Various other peripheral devices, such as additional data storage devices and printing devices, may also be connected to the computer system 100.

The present technology may be implemented in various forms of hardware, software, firmware, special purpose processors, or a combination thereof, either as part of the microinstruction code or as part of an application program or software product, or a combination thereof, which is executed via the operating system. In one implementation, the techniques described herein are implemented as computer-readable program code tangibly embodied in non-transitory computer-readable media 104. In particular, the present techniques may be implemented by anatomical region prediction module 107. Non-transitory computer-readable media 104 may include random access memory (RAM), read only memory (ROM), magnetic floppy disk, flash memory, and other types of memories, or a combination thereof. The computer-readable program code is executed by CPU 101 to process and display images acquired by an imaging device (e.g., C-arm, MR or CT scanner, etc.). The images may be stored in Digital Imaging and Communications in Medicine (DICOM) format or any other digital file format.

The computer system 100 is a general-purpose computer system that becomes a specific-purpose computer system when executing the computer-readable program code. The computer-readable program code is not intended to be limited to any particular programming language and implementation thereof. It will be appreciated that a variety of programming languages and coding thereof may be used to implement the teachings of the disclosure contained herein.

The same or different computer-readable media 104 may be used for storing a knowledge base, individual patient data, database of previously treated patients (e.g., training dataset), and so forth. The patient records, including associated image data, may be stored in external storage or other memories. The external storage may be implemented using a database management system (DBMS) managed by the CPU 101 and residing on a memory, such as a hard disk, RAM, or removable media. The external storage may be implemented on one or more additional computer systems. For example, the external storage may include a data warehouse system residing on a separate computer system, a picture archiving and communication system (PACS), or any other now known or later developed hospital, medical institution, medical office, testing facility, pharmacy or other medical patient record storage system.

It is to be further understood that, because some of the constituent system components and method steps depicted in the accompanying figures can be implemented in software, the actual connections between the systems components (or the process steps) may differ depending upon the manner in which the present invention is programmed Given the teachings of the present framework provided herein, one of ordinary skill in the related art will be able to contemplate these and similar implementations or configurations of the present framework.

Figure 2:
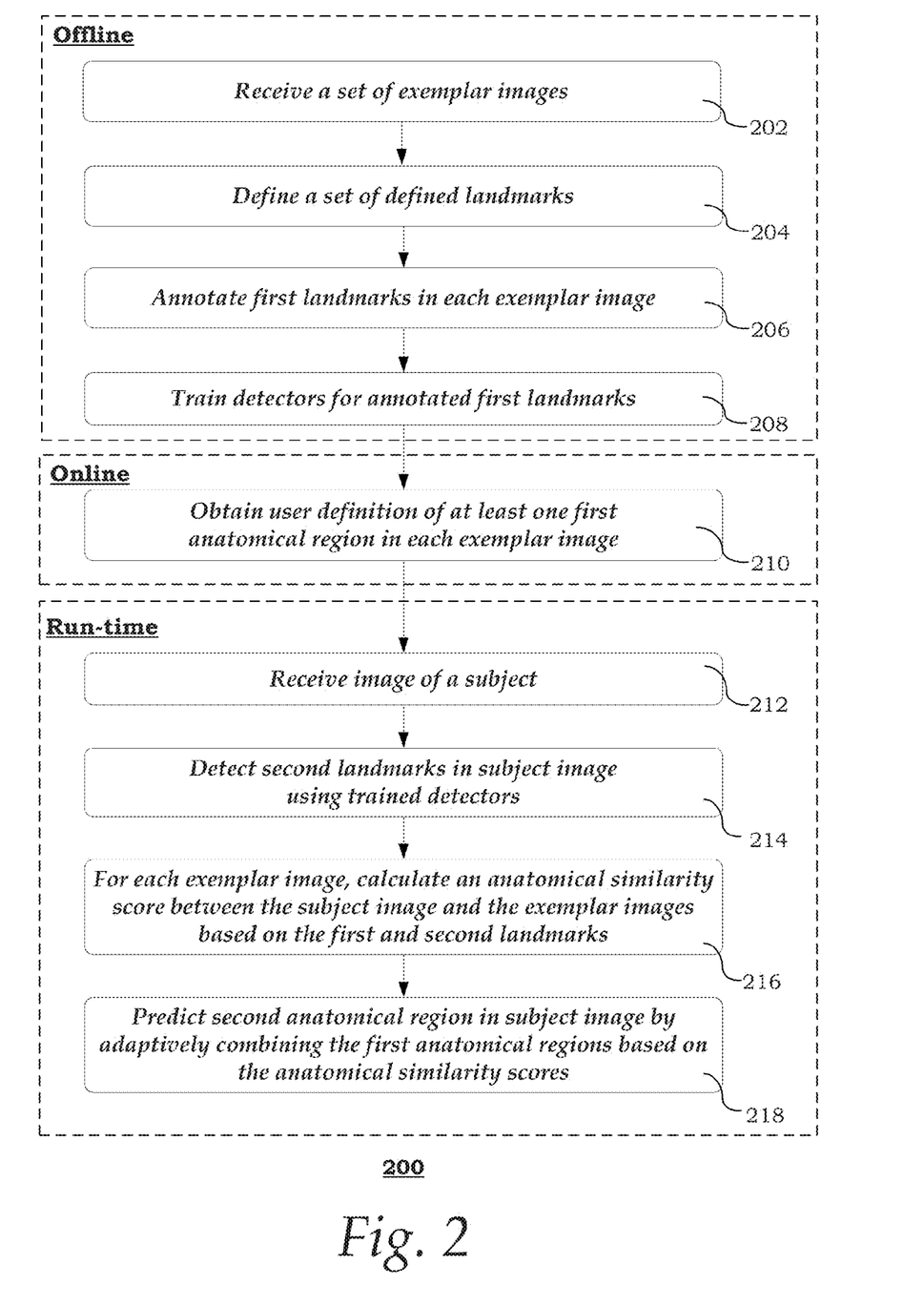
FIG. 2 shows an exemplary method of adaptive anatomical region prediction.

FIG. 2 shows an exemplary method 200 of adaptive anatomical region prediction. It should be noted that the steps of the method 200 may be performed in the order shown or a different order. Furthermore, different, additional or fewer steps may be implemented. Even further, the method 200 may be implemented with the system 100 of FIG. 1, a different system, or a combination thereof.

In accordance with some implementations, the method 200 is performed in three stages: offline, online and run-time. For example, steps 202-208 may be performed during the offline stage, while step 210 may be performed during the online stage and steps 212-218 may be performed during the run-time stage. The offline stage may be performed by, for example, the developer or manufacturer of the system 100, so as to provide trained detectors for use during the run-time stage. During the online stage, the user (e.g., physician, clinical personnel at a clinical site, etc.) may train the system 100 by defining one or more anatomical regions in each exemplar image. The online trainable model provided by the system 100 is a non-parametric model with no explicit training required. This advantageously allows the user to easily tailor the system 100 according to, for example, a specific scanning protocol or preferences of the clinical site, by adding, for example, new anatomical region definitions and new training cases. During the run-time stage, the user may execute the anatomical region prediction module 107 implemented in the system 100 to predict an anatomical region in a subject image in accordance with the techniques described herein.

Turning to FIG. 2, at 202, the system 100 receives a set of N exemplar images. The exemplar images are medical images of one or more structures of interest associated with a set of N subjects (e.g., patients previously treated at a clinical site). The number of exemplar images is preferably sufficient for machine learning (e.g., N=20, 50, etc.). The structures of interest may be any anatomical structures or portion thereof that have been identified for further study and examination, such as a musculoskeletal (MSK) structure (e.g., spine, vertebrae, joints, muscles, cartilage, ligaments) or any other anatomical structure (e.g., aorta, brain, colon, etc.).

The exemplar images may be received from, for example, a storage device, a database system or an archiving system, such as a picture archiving and communication (PACS) system. The exemplar images may also be acquired by, for example, a medical imaging device using techniques such as magnetic resonance (MR) imaging, computed tomography (CT), helical CT, x-ray, positron emission tomography (PET), PET-CT, fluoroscopy, ultrasound, single-photon emission computed tomography (SPECT), SPECT-CT, MR-PET, etc. Further, the exemplar images may be two-dimensional, three-dimensional, or four-dimensional.

The exemplar images may be extracted from a volumetric image data set. The medical images may include slice images that are obtained in the area of the structure of interest (e.g., spinal column, vertebrae, etc.) on the basis of previously determined tomographic data records. The orientation and position of the structure of interest may be substantially similar for all the exemplar images. The volumetric image data set may be stored in Digital Imaging and Communications in Medicine (DICOM) format. Any other digital file format may also be used.

At 204, a set of defined landmarks is specified. Each defined landmark may be indicative of a predetermined position of a respective feature of the structure of interest. Exemplary features that may be defined as landmarks include, for example, mid-points, extremities, or local regions of the structures of interest that are of anatomical relevance, such as the center of right and/or left kidneys, vertebrae, femur head, humerus heads, neck, top of the skull, base of the skull, top of lungs, aortic arch, pulmonary trunk, etc.

Figure 3:
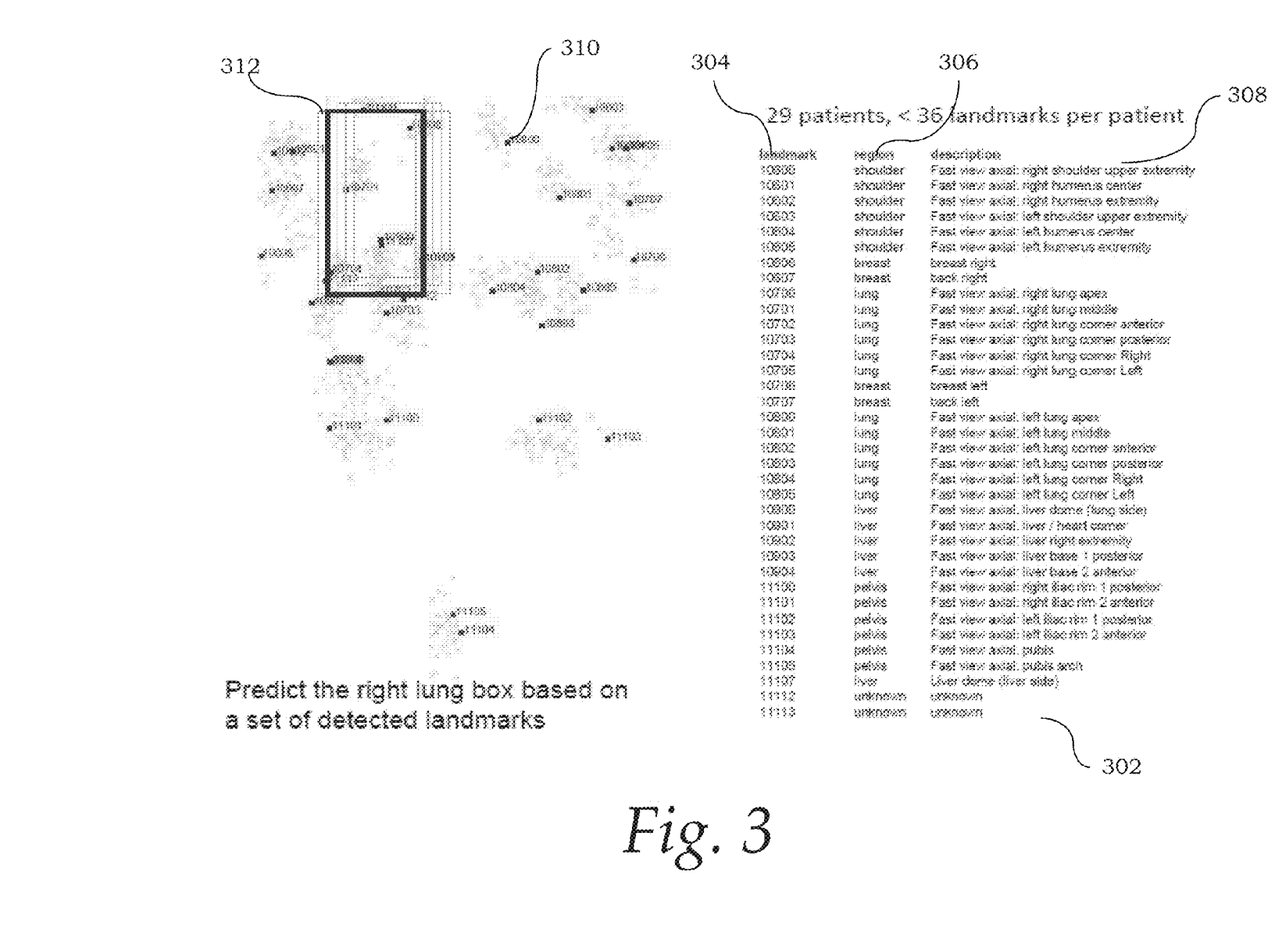
FIG. 3 shows an exemplary set of defined landmarks.

FIG. 3 shows an exemplary set of defined landmarks 302. Each defined landmark may be associated with a unique landmark identifier 304, a region 306 and a description 308. For example, landmark 10600 is associated with the shoulder region and represents the fast view axial: right shoulder upper extremity. The defined landmarks are specified for a training set of 29 exemplar images of 29 patients, with less than 36 landmarks per exemplar image (or patient).

Returning to FIG. 2, at 206, first landmarks in each exemplar image are annotated. Since not all the landmarks in the defined set may be available or detected in every exemplar image, the set of first landmarks in the exemplar image may be a subset or equal to the set of defined landmarks. In other words, the framework is advantageously able to handle "missing" landmarks in the exemplar images. The first landmarks may be annotated by identifying the locations of first landmarks in each exemplar image, and placing identifiers (e.g., name, unique identifier, etc.) and/or visual markers (e.g., cross, dot, etc.) at the respective locations. In addition, the first landmarks may be annotated automatically or semi-automatically using, for example, machine-learning detection techniques. See, for example, Yiqiang Zhan, Xiang Sean Zhou, Zhigang Peng, Arun Krishnan: Active Scheduling of Organ Detection and Segmentation in Whole-Body Medical Images, MICCAI (1) 2008: 313-321, which is herein incorporated by reference. Alternatively, the first landmarks may be manually annotated by a user. For example, the system 100 may provide a user interface to receive user input (e.g., user-placed marker or location information) for certain first landmarks.

At 208, detectors (or classifiers) are trained for the annotated first landmarks by using the exemplar images as training samples. A detector may be trained for each first landmark to, for example, automatically identify second landmarks in a new subject image in step 214. A machine-learning algorithm, such as the AdaBoost cascade training algorithm, may be applied to train the detectors.

At 210, the system 100 obtains a user definition of at least one first anatomical region in each exemplar image. For example, the system 100 may present a graphical user interface that allows the user to graphically define one or more first anatomical regions on each exemplar image. The anatomical region may be defined by a set of one or more points (e.g., a point, line, plane, volume, etc.). For example, the anatomical region may be defined by a box or any other geometrical shape. In some implementations, each anatomical region corresponds to a scan field-of-view (FOV). The FOV defines the area of anatomy being scanned during image acquisition. The user may define it in accordance with, for example, the clinical site's specific imaging protocol or preferences.

Figure 4:
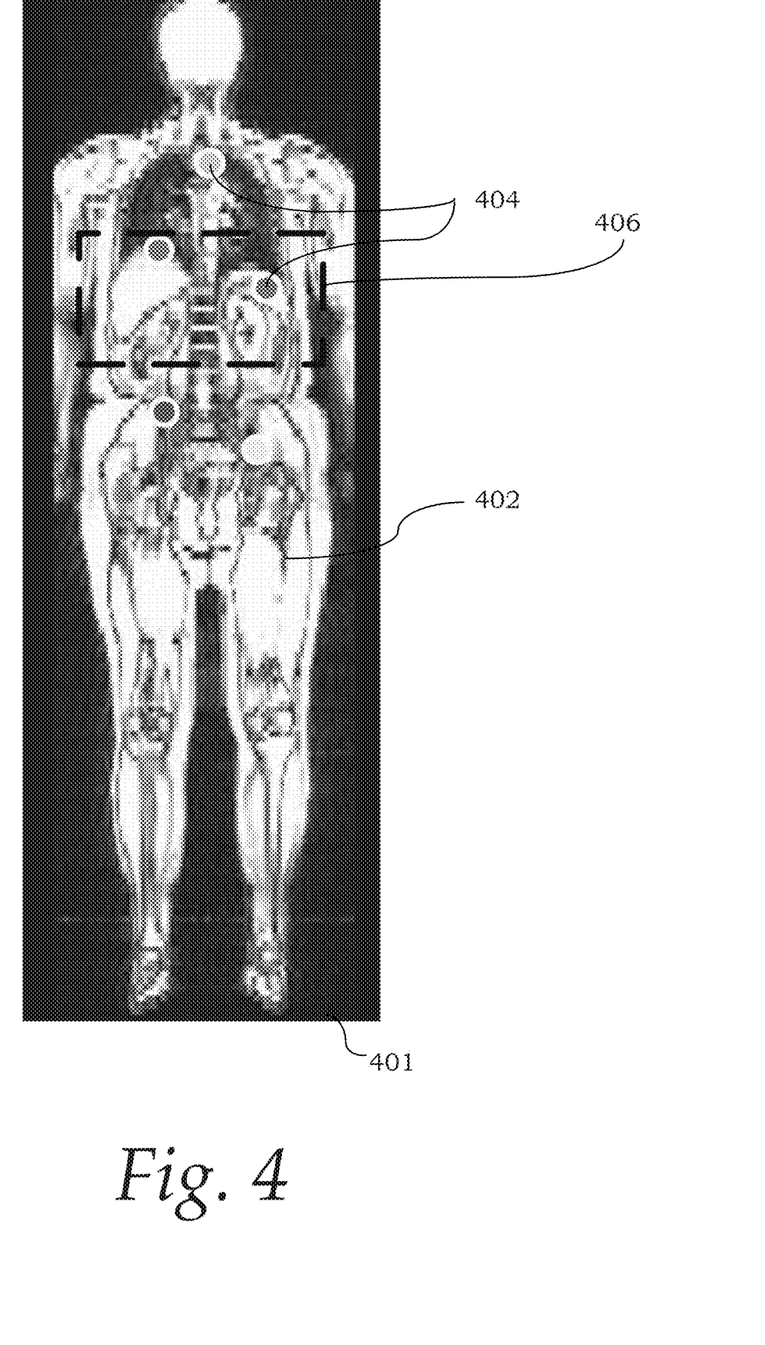
FIG. 4 shows an example of an exemplar image.

FIG. 4 shows an example of an exemplar image 401. The exemplar image 401 shows a full-body CT scan of a subject's body 402. The first landmarks 404 in the exemplar image 401 are annotated with visual markers. The user may define the first anatomical region 406 on the exemplar image 401 by, for example, specifying a box via a graphical user interface. This online step may be repeated until all the exemplar images are processed, or whenever new exemplar images are provided to the system 100. Since no computationally expensive "training" is required, it is advantageously easy for the user to add new exemplar images and define new corresponding first anatomical regions.

The information associated with the set of defined landmarks and first anatomical regions may be stored in a database. The database may include, for example, a hash table with keys for fast retrieval. Any other data structure is also useful. Each defined landmark may be associated with, for example, a patient identifier, a landmark identifier, a region, a description, etc. Each anatomical region may be associated with, for instance, a patient identifier, a region identifier, and so forth.

Returning to FIG. 2, at 212, the system 100 receives a new image of a subject (e.g., patient). The subject image may be provided during run-time of the anatomical region prediction module 107 to predict a second anatomical region (e.g., field-of-view). The subject image should be acquired by the same type of modality used to acquire the exemplar images. In addition, the structure of interest in the subject image may be captured in substantially the same relative orientation and position as the structures of interest in the exemplar images.

At 214, the system 100 detects second landmarks in the subject image. The second landmarks may be automatically detected using the detectors previously trained in step 208. The set of second landmarks may be equal to, or a subset of, the set of defined landmarks (as defined in step 204).

At step 216, the system 100 calculates an anatomical similarity score between the subject image and each exemplar image based on the first and second landmarks. An anatomical similarity score between the subject image and each exemplar image may be computed to provide a set of anatomical similarity scores.

In some implementations, a common set of first and second corresponding landmarks in the subject and each exemplar image is identified. Each anatomical similarity score may then be calculated based on the locations of the common set of first and second corresponding landmarks. For example, assuming that the exemplar image contains an M1 set of first landmarks and the subject image contains an M2 set of second landmarks, the M1 set of first landmarks may be a subset of the M2 set of second landmarks, or vice versa (i.e. M1≠M2).

In such cases, a common set of corresponding first and second landmarks in the subject image and each exemplar image may need to be identified. Each pair of corresponding first and second landmarks in the common set is associated with a particular common anatomical feature in the images.

In some implementations, a set of relevant first and second corresponding landmarks is identified from each common set of corresponding first and second landmarks, since not all landmarks in the common set may be relevant to the prediction. For example, in order to predict an anatomical box in the torso, the landmarks in the torso should contribute more than those landmarks that are outside the torso. The set of relevant first and second corresponding landmarks may be a subset, or equal to, the common set of corresponding first and second landmarks. Sets of relevant first and second landmarks may be selected to contribute to the similarity score, so as to provide a location-sensitive similarity score.

One exemplary method of deriving the set of relevant first and second landmarks involves selecting landmarks that are nearest to the anatomical region to be predicted. More particularly, such method may include identifying pairs of corresponding first and second landmarks in the common set, with first landmarks that are within a pre-determined threshold distance to the first anatomical regions. This method is straightforward, but may not always be accurate. For instance, tibia landmarks should not predict femoral boxes, even though they are nearer.

Another exemplary method involves using the semantic description (e.g., label) of the landmarks to determine its correlation to the anatomical region to be predicted. More particularly, the set of relevant first and second landmarks may be identified based on common semantic description shared with the first anatomical regions. For example, to predict an anatomical region in the right lung, all landmarks with a description or label that includes the words "right lung" are selected. However, such method may lack generality and requires domain knowledge.

Yet another exemplary method involves applying a machine learning algorithm to cluster the landmarks into different groups based on their spatial correlations. For instance, the landmarks may be clustered using an affinity propagation method based on their relative positions across subjects. See, for example, Brendan J. Frey and Delbert Dueck, "Clustering by Passing Messages between Data Points," Science 315,972-976, February 2007, which is herein incorporated by reference. Each cluster of landmarks corresponds to one or more particular regions of anatomical significance. This method advantageously provides a principled data-driven solution.

In some implementations, a global alignment is performed on the subject image prior to computing the distance between first and second corresponding landmarks. In some implementations, the global alignment is performed by applying Procrustes alignment to ensure that the subject image is optimally superimposed on each exemplar image. Procrustes alignment may be performed by optimally transforming (e.g., translating, rotating, scaling) the common set of second landmarks in the subject image. Any other methods of global alignment are also useful.

After global alignment is performed, the distance between each pair of corresponding first and second landmarks in the common set (or set of relevant first and second landmarks derived from the common set) may be computed. Next, the mean of the distances between M pairs of corresponding first and second landmarks may then be computed. The standard error for the mean (SE) may further be computed based on the mean as follows:

$$SE = \text{standard\_deviation (Mean)}/\text{sqrt}(M) \quad (1)$$

The anatomical similarity score between the subject image and the exemplar image may then be computed as follows:

$$\text{anatomical\_similarity\_score} = \text{Mean} + 1.96 \times SE \quad (2)$$

In some implementations, outlier distances are removed prior to computing the mean and SE. The anatomical similarity score computation is therefore advantageously robust to outliers. Outlier distances may be removed from the computation based on, for example, the Chauvenet's criterion. The Chauvenet's criterion is a means of assessing whether the distance is likely to be spurious.

FIG. 3 illustrates the exemplary mean location 310 computed for each landmark in the dataset. The anatomical region 312 that delineates a right lung region may be predicted based on the anatomical similarity scores computed based on the means and standard errors, as will be described in more detail with reference to step 218.

Figure 5:
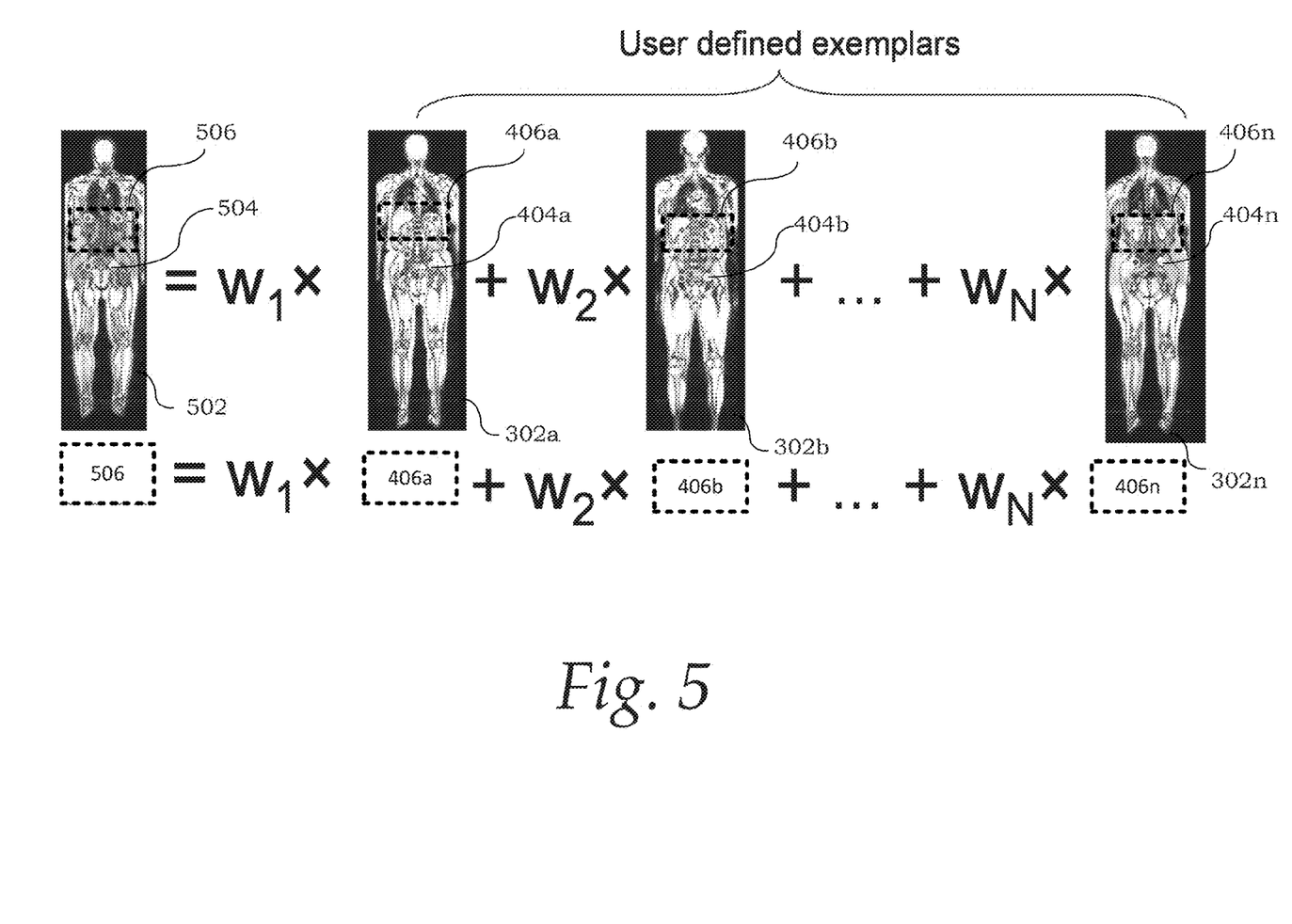
FIG. 5 shows a schematic representation of an exemplary adaptive combination of anatomical regions.

Returning to FIG. 2, at 218, a second anatomical region in the subject image may be predicted by adaptively combining the first anatomical regions in the exemplar images based on the set of anatomical similarity scores. FIG. 5 shows a schematic representation of an exemplary adaptive combination of anatomical regions. As shown, the subject image 502 includes a set of detected landmarks 504. The second anatomical region 506 in the subject image 502 may be predicted by selectively combining the first anatomical regions 406a-n.

More particularly, each anatomical region may be represented by a set of one or more points. For instance, an anatomical region may be represented by a box defined by a set of 8 points. The location of each point of the anatomical region is represented by an n-tuple (e.g., n=2 for 2D image, n=3 for 3D image, etc.). For example, if the exemplar and subject images are 3D, the location of each point is represented by a triple of coordinates. Each triple of coordinates (e.g., (x, y, z)) defining the second anatomical region 506 may be predicted by selectively combining the triples $(x_a, y_a, z_a)$, $(x_b, y_b, z_b), \ldots, (x_n, y_n, z_n)$ associated with the corresponding points of the anatomical regions 406a-n via the combination coefficients (or weights) $w_1$-$w_N$ as follows:

$$x = (w_1 * x_a) + (w_2 * x_b) + \ldots + (w_N * x_n) \quad (3)$$

$$y = (w_1 * y_a) + (w_2 * y_b) + \ldots + (w_N * y_n) \quad (4)$$

$$z = (w_1 * z_a) + (w_2 * z_b) + \ldots + (w_N * z_n) \quad (5)$$

The combination coefficient (or weight) associated with each exemplar image may be proportional to, for example, $\exp(-d)$, wherein d is the average Euclidean distance between first and second landmarks. In some implementations, the combination coefficient is derived based on the softmax function, in which only several largest $w_i$ are non-zero. Other methods of deriving the combination coefficients are also useful. The value of each combination coefficient provides an indication of the relevance of the associated exemplar image. For example, the exemplar image associated with a relatively low combination coefficient is less relevant (or anatomically similar to the subject image) than the exemplar image with a relatively higher combination coefficient.

Figure 6:
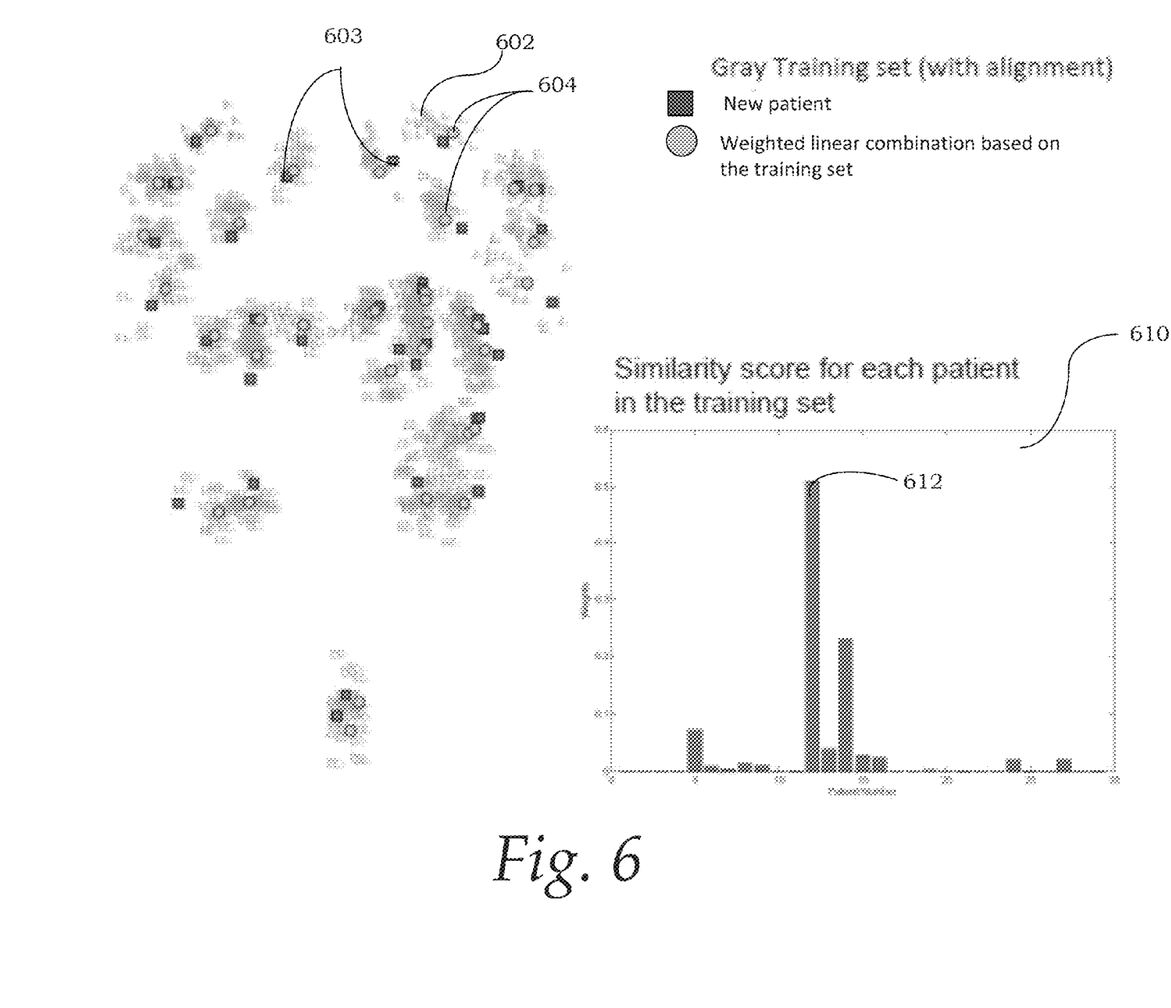
FIG. 6 shows exemplary average locations of landmarks associated with a training set of exemplar images.

FIG. 6 shows exemplary average locations 602 of landmarks associated with a training set of exemplar images. The squares 603 denote the actual locations of the landmarks associated with the new patient (i.e. subject image), and the circles 604 denote the locations predicted by the weighted linear combination of locations based on the training set. As can be observed, the predicted locations 604 are very close to the actual locations 603. The graph 610 shows the values of similarity scores associated with the respective patients (or exemplar images) in the training set. The exemplar image associated with patient number 12 has the highest similarity score 612, and therefore makes the largest relative contribution to the predicted anatomical region. Advantageously, the similarity scores may be used to provide confidence intervals that quantify uncertainty for the predictions.

Figure 7:
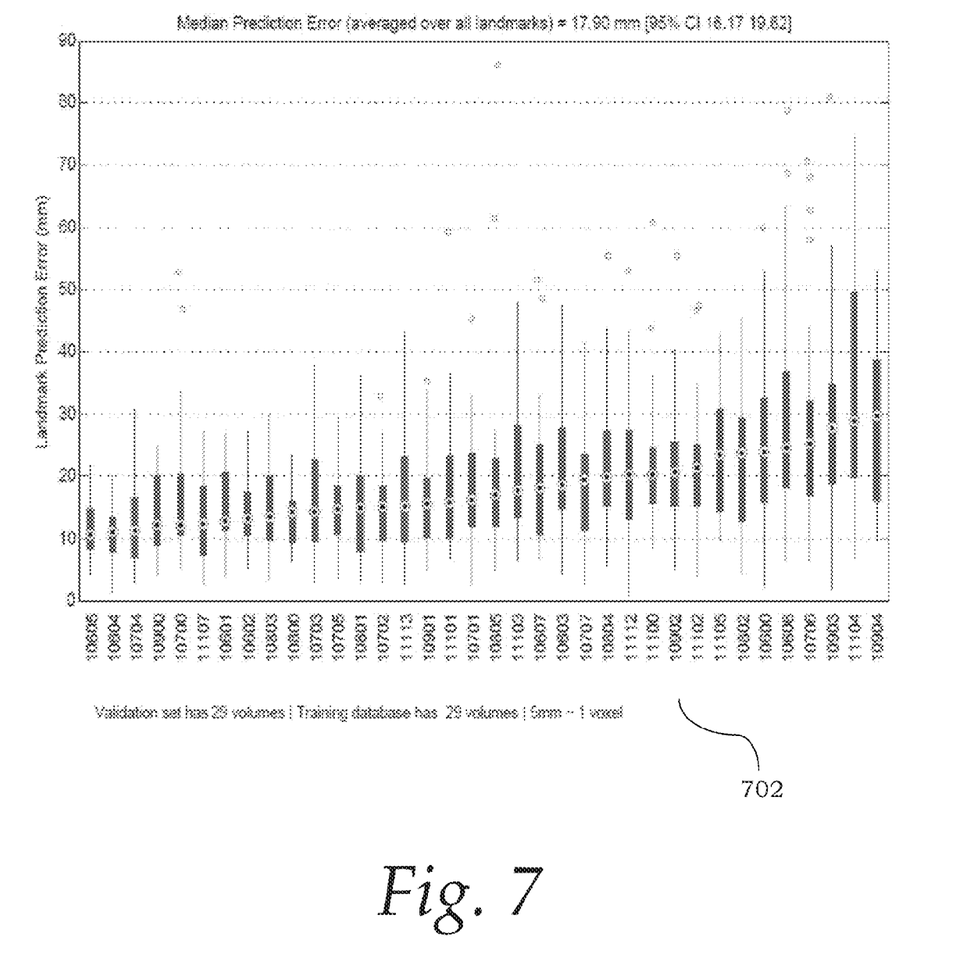
FIG. 7 shows a graph illustrating results of a feasibility study of the present framework.

FIG. 7 shows a graph 702 illustrating results of a feasibility study of the present framework. The feasibility study was performed using a training set of 29 exemplar volumetric images and a validation set of 29 volumetric images. The prediction of an anatomical region in each validation image was simplified into a task of predicting a set of 8 corner points of a box. This can be simulated by removing one landmark from the validation image and predicting it based on the other landmarks. The removed landmark is used as ground truth to validate the prediction. The error in prediction of the landmark is then computed and averaged over all the training images. The graph 702 shows the prediction error for each landmark. It can be observed that the median prediction error averaged over all landmarks is around 17.90 mm.

While the present invention has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

The invention claimed is:

1. A method for adaptive region prediction, comprising:
   receiving, by a processor, a set of exemplar images including annotated first landmarks;
   obtaining, by the processor, user definitions of first anatomical regions in the exemplar images;
   detecting, by the processor, second landmarks in a subject image;
   computing, by the processor, anatomical similarity scores between the subject image and the exemplar images based on the first and second landmarks; and
   predicting, by the processor, a second anatomical region in the subject image by adaptively combining coordinates of points representing the first anatomical regions weighted by coefficients derived from the anatomical similarity scores.

2. The method of claim 1 further comprising acquiring the set of exemplar images and the subject image by magnetic resonance (MR) imaging, computed tomography (CT), helical CT, x-ray, positron emission tomography (PET), PET-CT, fluoroscopy, ultrasound, single-photon emission computed tomography (SPECT), SPECT-CT, MR-PET, or a combination thereof.

3. The method of claim 1 further comprising:
   annotating a set of the first landmarks in each exemplar image;
   training detectors for the annotated first landmarks, and using the trained detectors to automatically detect the second landmarks in the subject image.

4. The method of claim 3 wherein annotating the set of the first landmarks in each exemplar image comprises annotating, in each exemplar image, a subset of a set of defined landmarks.

5. The method of claim 3 further comprising:
defining a set of defined landmarks; and
storing the set of the defined landmarks and the user definitions of the first anatomical regions in a database.

6. The method of claim 1 wherein obtaining the user definitions of the first anatomical regions in the exemplar images comprises obtaining the user definitions via a graphical interface, wherein the user definitions comprise geometrical shapes.

7. The method of claim 1, wherein computing the anatomical similarity score comprises:
identifying a common set of corresponding first and second landmarks in the subject image and each exemplar image; and
computing the anatomical similarity scores based on the common sets of corresponding first and second landmarks.

8. The method of claim 7 further comprising:
identifying a set of relevant first and second landmarks from each common set of corresponding first and second landmarks; and
computing the anatomical similarity scores based on the sets of relevant first and second landmarks.

9. The method of claim 8 wherein identifying the set of relevant first and second landmarks comprises identifying pairs of corresponding first and second landmarks from the common set of corresponding first and second landmarks, wherein the pairs include first landmarks that are within a pre-determined distance to the first anatomical regions.

10. The method of claim 8 wherein the set of relevant first and second landmarks is identified based on common semantic description shared with the first anatomical regions.

11. The method of claim 8 wherein the set of relevant first and second landmarks is identified using a machine learning algorithm.

12. The method of claim 1 further comprising applying a global alignment on the subject image prior to computing the anatomical similarity scores between the subject image and the exemplar images.

13. The method of claim 12 wherein applying the global alignment comprises applying a Procrustes alignment to optimally superimpose the subject image on each exemplar image.

14. The method of claim 1 wherein computing the anatomical similarity scores between the subject image and the exemplar images based on the first and second landmarks comprises:
calculating distances between corresponding first landmarks in the subject image and second landmarks in each exemplar image; and
calculating the anatomic similarity score of each exemplar image based on the distances.

15. The method of claim 14 wherein calculating the anatomical similarity score includes combining a mean of the distances and a standard error for the mean of the distances.

16. The method of claim 14 further comprising removing outlier distances from computation prior to calculating the anatomical similarity score of each exemplar image.

17. The method of claim 1 wherein the first and second anatomical regions correspond to fields-of-view.

18. The method of claim 1 wherein predicting the second anatomical region in the subject image comprises:
deriving the coefficients from the anatomical similarity scores; and
calculating, based on the coefficients, a weighted linear sum of corresponding elements of the coordinates of the first anatomical regions to determine points representing the second anatomical region.

19. A non-transitory computer-readable medium embodying a program of instructions executable by machine to perform steps for adaptive region prediction, the steps comprising:
receiving a set of exemplar images including annotated first landmarks;
obtaining user definitions of first anatomical regions in the exemplar images;
detecting second landmarks in a subject image;
computing anatomical similarity scores between the subject image and the exemplar images based on the first and second landmarks; and
predicting a second anatomical region in the subject image by adaptively combining coordinates of points representing the first anatomical regions weighted by coefficients derived from the anatomical similarity scores.

20. A system for adaptive region prediction, comprising:
a non-transitory memory device for storing computer-readable program code; and
a processor in communication with the memory device, the processor being operative with the computer-readable program code to perform steps comprising:
receiving a set of exemplar images including annotated first landmarks;
obtaining user definitions of first anatomical regions in the exemplar images;
detecting second landmarks in a subject image;
computing anatomical similarity scores between the subject image and the exemplar images based on the first and second landmarks; and
predicting a second anatomical region in the subject image by adaptively combining coordinates of points representing the first anatomical regions weighted by coefficients derived from the anatomical similarity scores.

* * * * *